United States Patent [19]
Hommes

[11] Patent Number: 5,939,845
[45] Date of Patent: Aug. 17, 1999

[54] METHOD FOR CONTROLLING TENTER CLIP GAP SPACING DURING SIMULTANEOUS BIAXIAL STRETCHING USING LINEAR SYNCHRONOUS MOTORS

[75] Inventor: William John Hommes, Hockessin, Del.

[73] Assignee: E. I. du Pont de Nemours and Company, Wilmington, Del.

[21] Appl. No.: 09/046,096

[22] Filed: Mar. 23, 1998

[51] Int. Cl.[6] .................................................. H02P 7/74
[52] U.S. Cl. .............................. 318/6; 26/73; 264/290.2; 318/135
[58] Field of Search ................... 26/72, 73, 89, 26/90; 264/288.4, 290.2, DIG. 73; 226/108, 111; 425/DIG. 53, 66; 310/12; 318/135, 6, 7

[56] References Cited

U.S. PATENT DOCUMENTS

| | | | |
|---|---|---|---|
| 3,427,684 | 2/1969 | Tsien | 26/73 |
| 3,803,466 | 4/1974 | Starkey | 104/292 |
| 3,890,421 | 6/1975 | Habozit | 264/289 |
| 3,932,919 | 1/1976 | Hutzenlaub | 26/73 |
| 4,625,372 | 12/1986 | Hufnagel et al. | 26/73 |
| 4,637,103 | 1/1987 | Hutzenlaub | 26/73 |
| 4,675,582 | 6/1987 | Hommes et al. | 318/38 |
| 4,825,111 | 4/1989 | Hommes et al. | 310/12 |
| 5,072,493 | 12/1991 | Hommes et al. | 26/72 |

FOREIGN PATENT DOCUMENTS 195 13 301   2/1996   Germany .

*Primary Examiner*—Jonathan Salata

[57] ABSTRACT

A method is disclosed of temporarily speeding up delayed carriages on a return side of an endless loop of driven carriages in a linear motor web tenter.

10 Claims, 5 Drawing Sheets

METHOD FOR CONTROLLING TENTER CLIP GAP SPACING DURING SIMULTANEOUS BIAXIAL STRETCHING USING LINEAR SYNCHRONOUS MOTORS

BACKGROUND OF THE INVENTION

The invention relates to control of clip carriages in simultaneous biaxial tenters for stretching webs of material wherein clip carriages are independently propelled in two opposed endless loops. The invention in particular relates to tenters using linear motors to propel the carriages throughout the endless loops. On the inner facing sides of the two loops, the web is grasped by clips on the carriages at the entrance of each loop and stretched longitudinally by progressively accelerating individual carriages thereby causing them to become spaced apart. At the same time the carriages can be guided laterally apart thereby stretching the web laterally. At the end of each loop, the web, now traveling at a higher speed than at the entrance, is released from the carriages and the carriages are returned to the beginning of the loop where the web is once again grasped and stretched by the diverging accelerating carriages. On the return side of each loop, the carriages must be slowed from the web release speed to the web grasping speed, at which speed the carriages are abutted with each other. Such a linear motor propelled, web tenter system with the above carriage control is described in U.S. Pat. No. 5,072,493 to Hommes et al. Additional details and improvements in such system are described in patent publications DE 4436676 to Steffl (clip carriages), DE 19513301 to Briel et al (eddy current disc for carriages stacking), and DE 19517339 to Ruehlemann (rail transitions at exit turn).

Controlling the carriages on the return side of each loop has presented challenges in handling the carriages during start up of the tenter and process upsets, handling large gaps between carriages that may cause a shortage of carriages at the web grasping end of the loop, and handling the same number of carriages at different stretching ratios. At a low stretch ratio, a lot of carriages are on the web sides of the loops and fewer are on the return sides, while for high draw ratios, fewer carriages are on the web sides of the loops and more are on the return sides. There are also economic concerns about keeping the return side system simple and low cost since precise control of the carriages is not required on the return side where there is no interaction with the web.

Nevertheless, one suggested method of operating the return side is to provide linear motors that interact synchronously with permanent magnets on the carriages to predictably control the speed and position of the carriages. These magnets are the same magnets that are required for precise control on the web stretching side of the loops. For precise return side control, the motor drives for control of adjacent motor windings can be frequency and phase synchronized or partially frequency and phase synchronized as the carriages pass from one motor winding to the next. For less precise control and lower cost, the motor drives may not be frequency and phase synchronized as the carriages pass from one motor winding to the next; some loss of control of speed and position will be experienced, but it may not affect overall operation.

At the loop turns at the web entrance ends of the endless loops, an eddy current disc, as described in the '301 reference, may be employed for each loop. It is driven at a speed faster than the desired carriage speed at the web entrance of the loop. This removes all gaps between carriages and abutts them with a low collision force that does not damage the carriages, which are provided with bumpers for this purpose. The eddy current disc also develops sufficient cumulative force on the stack of carriages to insure that the carriages entering the film side of the machine are pushed tightly against the first few film side carriages with no gaps. This pushing force also contributes to the force required of the first few carriages on the film side to develop web tension prior to the tenter.

Although this improved system achieves a simplified operation and reduced costs, there is a problem that this system does not handle large gaps that may occur between carriages unpredictably. For instance, on the web side a gap between carriages may occur when there is a web break during thread-up or continuous operation that causes the carriages to get out of synchronism with the electromagnetic wave developed by the motor winding. In this situation, one or several carriages may fall behind and bunch-up leaving a large upset gap ahead of the bunched-up carriages. For the bunched-up carriages to catch up to their steady state positions, the upset gap must be closed before it reaches the entrance end of the tenter. When this gap gets to the return side, the only way proposed by known systems to close the gap is by increasing the speed of the eddy current disc, but this has been found to be insufficient for closing a gap greater than about 2 meters, and cannot handle multiple, or recurring, closely spaced gaps of 1.5–2.0 meters. The eddy current disc is torque controlled so its speed increases over a limited range when a gap is experienced by the disk. This is because the resisting force the carriages exert on the disk decreases with fewer carriages adjacent the disk. Since the disk is running at a constant torque, the lower resistance causes the disk to speed up. As the disk speeds up, the relative motion between the disk and carriages stacked adjacent the disk increases until the resisting force of the carriages and the driving torque of the disk is again in balance. The increased speed of the disk allows carriages that are up to two meters behind to catch up to the stack of carriages on the disk. With a gap greater than two meters, the bunched-up carriages arrive too late at the entrance end and a gap occurs on the web side of the loops which shuts down the tenter. Additionally, there may be so few carriages engaged by the eddy current disc that there is insufficient force developed to achieve the necessary web tension by the first few carriages on the web sides of the loops. Shut down of the tenter is highly undesirable for a tenter that stretches continuously cast polymer sheet that must be diverted to waste during resynchronization of the carriages. There is a need for a simple system for handling large gaps (greater than 2 meters) or frequently recurring gaps of 1.5–2.0 meters to maintain a continuous supply of abutted carriages to the eddy current disc and the web side of the loops.

SUMMARY OF THE INVENTION

The invention is directed to a method of temporarily speeding up delayed carriages on a return side of an endless loop of driven carriages in a linear motor web tenter comprising two such loops, each driven carriage provided with a linear motor secondary adapted for web stretching propulsion on a web engaging side of the endless loop, comprising:

(a) propelling the driven carriages, at a constant speed in a transport portion on the return side, with a propulsion means interacting with the carriage secondary, the transport portion extending over a length of the return side between a carriage entrance end and a carriage exit end, said constant speed being such as to provide a steady state supply of carriages to a continuously abutted length of carriages in a moving stack at a turning portion adjacent the exit of the return side;

(b) propelling the carriages, at a speed less than said constant speed, at said turning portion with a propulsion means interacting with the carriage secondary;

(c) sensing the distances between carriages arriving in the transport portion on the return side and detecting the excess length of an undesirable gap between carriages arriving in the transport portion on the return side;

(d) temporarily increasing the speed of all carriages in the transport portion on the return side in response to said undesirable gap;

(e) continuing said temporarily increasing to increase the speed of a delayed plurality of carriages immediately following the undesirable gap and to temporarily increase the length of the stack before the gap reaches the end of the transport portion;

(f) decreasing the speed of all carriages in the transport portion to said constant speed;

wherein the undesirable gap is eliminated between carriages exiting the return side.

In another embodiment, the propulsion means for said transport portion comprises means for varying the speed of carriages in discrete subsections of said transport portion, and temporarily increasing the speed comprises temporarily increasing the speed of a plurality of delayed carriages that are bunched-up and trailing said undesirable gap to thereby move said plurality of carriages so the bunched-up carriages are closely spaced and leading said undesirable gap, before said plurality of carriages reach the end of the transport portion.

DETAILED DESCRIPTION OF THE INVENTION

Figure 1:
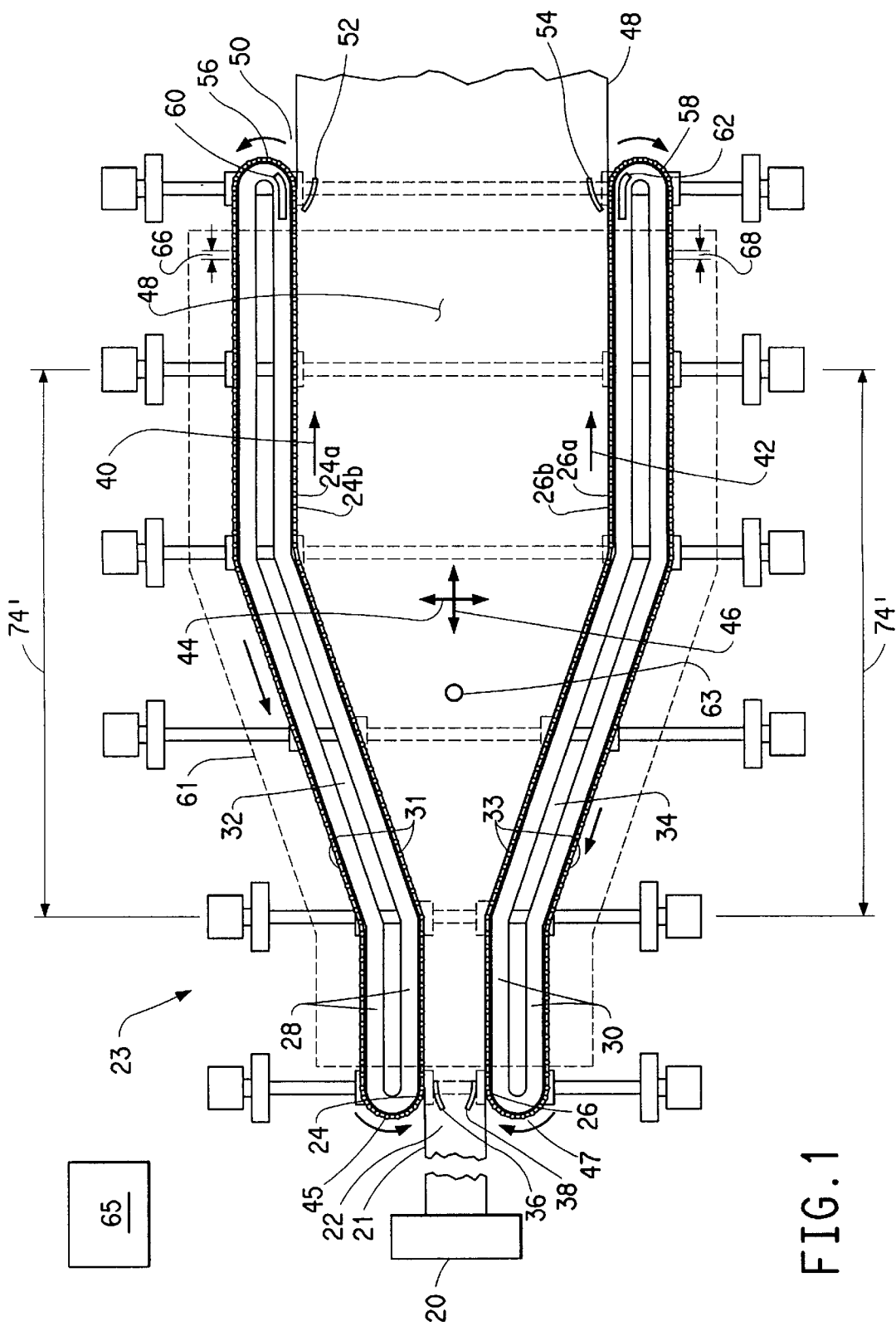
FIG. 1 shows a schematic plan view of a typical tenter-type stretcher for a web.

FIG. 1 shows a schematic plan view of a typical tenter-type stretcher for a web, such as a film. The polymer is cast onto a chilled roll at 20 to form a cast film 21 that is fed to the entrance 22 of the stretcher 23 where it is grasped by clips on carriages, such as carriages 24 and 26, riding on tracks, such as tracks 28 and 30, in opposed recirculating endless loops, 32 and 34. The carriages, in addition to containing clips, contain a linear motor secondary (not shown), such as a permanent magnet. These secondaries are closely spaced from linear motor primaries 31 and 33 adjacent the tracks 28 and 30, respectively, that develop moving electromagnetic fields that propel the carriages along the loops. There may also be film clips on idler carriages (not shown) nested in between the powered carriages containing secondaries. The idler carriages would further support the film and be propelled by the film, which is propelled by the powered carriages. At the entrance end 22, there are cam surfaces or magnetic means 36 and 38 that act on a clip lever on each carriage to close the clips to grip the edge of the film. As the carriages proceed along the tracks in the direction of arrows 40 and 42, the film is stretched laterally in direction 44 and, in the case of a simultaneous stretcher, the film is stretched longitudinally in direction 46. At the entrance 22, the carriages 24 are abutted in a stack 45 in loop 32 and the carriages 26 are abutted in a stack 47 in loop 34. At the position of arrows 40 and 42 in both loops, the carriages are spaced apart, such as carriages 24a and 24b, and carriages 26a and 26b in loops 32 and 34 respectively. Such a simultaneous-type stretcher is described in U.S. Pat. No. 5,072,493 to Hommes et al.

The stretched film 48 then proceeds to the exit end 50 of the stretcher where there are cam surfaces or magnetic means 52 and 54 that act on the clip lever on each carriage to open the clips to release the edge of the film. The film is released before it reaches the end 50 of the stretcher. The stretched film 48 leaving the stretcher has tension applied by winding devices (not shown) that wind the film into rolls. This tension insures the film edges are pulled from the spaced apart carriages as the carriages 24 and 26 move away from the film at end turns 56 and 58 to return to the entrance end 22 of the stretcher where the carriages are again abutted in a stack. Near the exit end 50 of the stretcher, and located along a distance that spans the cam surfaces 52 and 54, are jet means 60 and 62 directed at the clips on the carriages that act, during a film tear, to remove film edges and debris from the clips so no edge or debris is carried to the return side of the stretcher.

Frequently, there is an oven enclosure 61 (shown in dashed lines) surrounding a major portion of the stretcher 23 for controlling the thermal condition (heating and cooling) of the film as it is being stretched, and for keeping the clips heated. There are a plurality of sensors, such as sensor 63, located in the oven and directed at the film to monitor film temperature for control purposes. In the case of film tears, the temperature sensed by the sensor 63 changes dramatically as the film moves away from the sensor, and this can be used to detect film tears in the stretcher. In this case, the sensor 63 also serves as a position detector to sense the presence of the planar film in the stretcher. A controller 65 is used to operate the stretcher and monitor the output from sensors, such as sensor 63.

Figure 2:
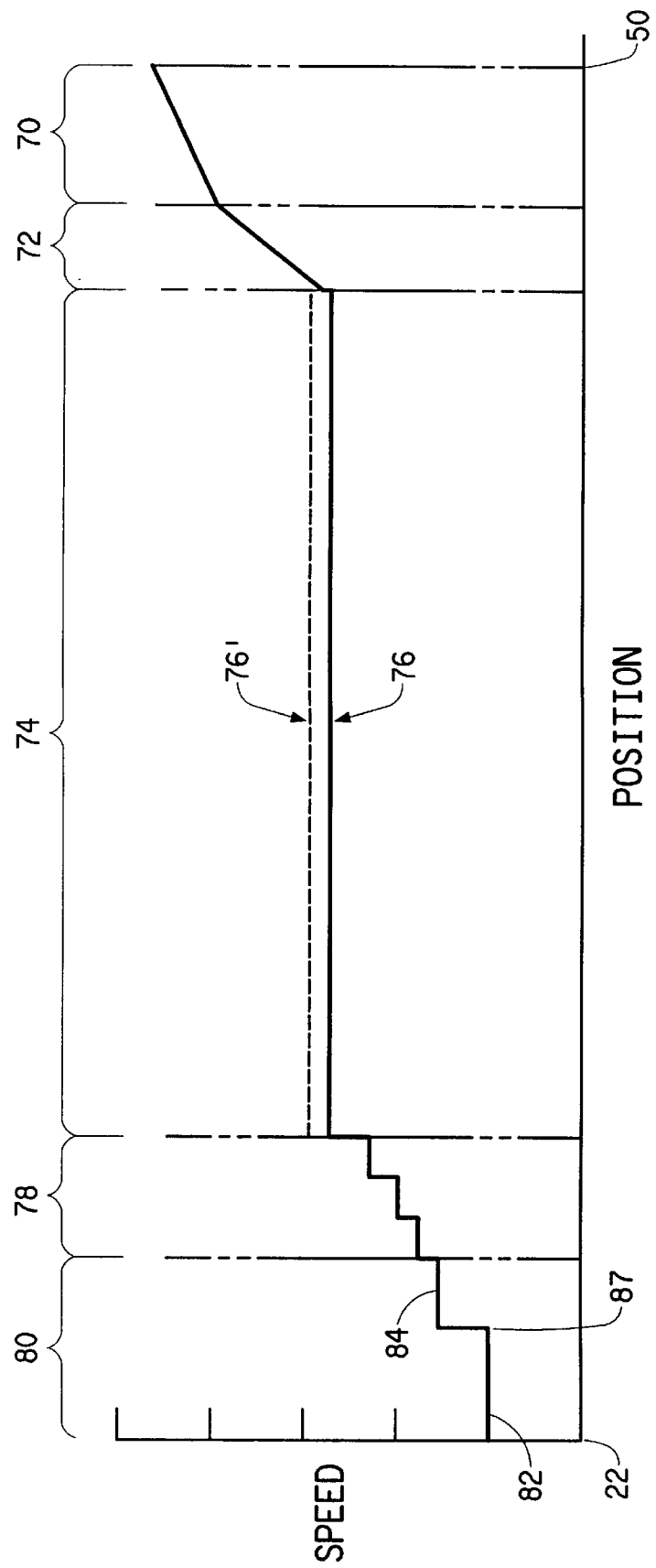
FIG. 2 shows a speed versus position plot of the carriages in each loop as they travel along the return side of the stretcher.

After leaving the end turns 56 and 58 of each loop, the carriages must begin slowing down and closing up the spaces 66 and 68 between carriages in each loop so the carriages are abutted when they return to the entrance end 22. FIG. 2 shows a typical speed versus position plot (solid line) of the carriages in each loop as they travel along the return side from the exit end 50 to the entrance end 22. The carriages are moving from right to left in the FIG. 2 plot as they would be in FIG. 1. The return side is the same for each loop and comprises several portions. In portion 70, the carriages decelerate gradually so any idler carriages present gently pile up against the leading powered carriage without damaging collision forces; elastomeric bumpers on the idler and powered carriages are provided to minimize these forces. In portion 72, steeper deceleration may be applied to slow the carriages quickly before arriving in portion 74, a constant speed, transport control, portion. The transport portion for each loop may be positioned as at 74' in FIG. 1. The horizontal heavy line 76 in FIG. 2 indicates the constant speed versus position of the carriages in the transport portion 74. Some variations may occur for individual carriages but the average speed is indicated by the solid line. Portion 78 is a space closing portion where the carriages are brought closer together just before abutting. Portion 80 is the abutting portion where the carriages at the entrance end 22 are traveling abutted at a speed indicated at horizontal line 82 which is fixed by the speed of the film entering the stretcher. The carriages in portion 80 are urged to go faster than the abutted speed as indicated by line 84 so they form a moving abutted stack 45 (FIG. 1) at position 87 (FIG. 2) before reaching the entrance end 22. For a steady state operating condition, each carriage is controlled to be at a particular position along the return side at a particular time. The steady state position of any given carriage along the return side is predictable.

Figure 3A:
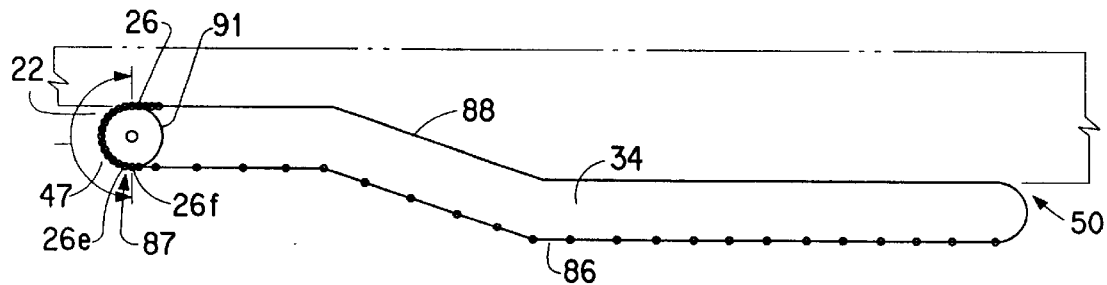
FIGS. 3A, 3B, and 3C are schematic plan views of the carriages on a return side of a loop of the stretcher of FIG. 1.

FIG. 3A is a schematic plan view of the carriages 26 on a return side 86 of loop 34 of the stretcher of FIG. 1. The carriages along the film stretching side 88 of the loop are not shown for clarity. The return side carriages are generally following the carriage speed versus position illustrated in FIG. 2, and along transport line 76. The carriages are regularly spaced along most of the return side and the spacing closes up and the carriages are abutted in a moving stack 45 at position 87. In normal operation the trailing end carriage 26e in the stack 86 is moving forward and is being rapidly replaced by the next carriage 26f so the end of the stack stays at about the same position at 87. In practice, the abutting portion 80 or the return side (FIG. 2) is represented by an eddy current disc, such as a metal surfaced wheel 91, operating in a carriage supply turn 92 that interacts with the carriage secondary magnets to asynchronously propel them. The speed imparted by the interacting surface of the wheel is greater than the speed the carriages are being consumed at the entrance end 22 of the stretcher.

Figure 3B:
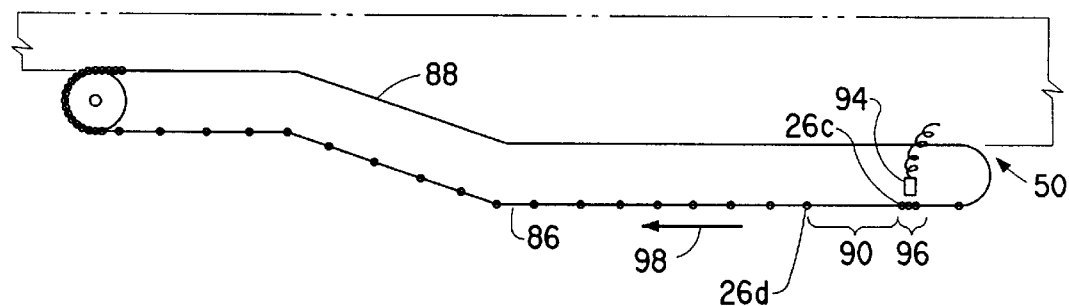

FIG. 3B shows what happens to the carriages when there is a disturbance on the film side 88 that causes some of the powered carriages to loose synchronism with the electromagnetic wave, become delayed, and fall back and bunch up with following carriages. This creates an upset gap 90 between the first bunched-up, delayed, carriage at 26c and the leading undelayed carriage at 26d. If a small upset gap occurs, when the carriages 26c and 26d arrive at abutting portion 80 (FIG. 2), the overspeed in abutting portion 80 may be sufficient to permit the delayed carriage 26c to catch up with the undelayed end carriage 26d at the end of the stack before the stack gets too short. Such a system is described in patent publication DE 19513301 assigned to Bruckner-Machinenbau by Briel et al. However, when a large upset gap is present, the undelayed end carriage 26d may proceed a significant distance around the carriage supply turn 92 before being replaced by the next carriage, delayed carriage 26c. This can cause problems with the operation of the stretcher. The force applied to the entering film by the first few carriages is dependent on the number of abutted carriages being propelled together in the carriage supply turn 92. If too few carriages are being propelled, the total combined force exerted by the stacked carriages may be too low to reliably pull the film into the stretcher. In the worst case, the next stack end replacement carriage does not catch up with the moving stack end carriage before the film must be grasped, and the replacement carriage will be out of synchronism with the magnetic wave propelling the film stretching carriages at the entrance end 22 of the stretcher. This will result in shutdown of the stretcher and film will be wasted as the stretcher is restarted.

It has been discovered that the upset gap can be handled without upset to the stretcher if: 1) an excess of carriages are accumulated in the stack and the delayed carriages following the upset gap are caught up to their steady state position before the upset gap reaches the abutting portion, or 2) the delayed carriages are caught up to their steady state position and the upset gap is repositioned behind the bunched-up carriages instead of in front of them before the upset gap reaches the abutting portion. In both cases, preferably the upset gap is accommodated before it reaches the end of the transport portion. Strategy 1) can be accomplished by sensing the upset gap and speeding up all the carriages in the transport portion to cause a number of carriages ahead of the gap to get to the stack early and the delayed carriages immediately behind the gap to get to the stack at least on time. Strategy 2) can be accomplished by selectively speeding up the bunched-up, delayed, carriages so they move ahead of the upset gap to thereby arrive at the abutting portion at least on time before the upset gap reaches the abutting portion. To accommodate a large upset gap, the stack end may temporarily move beyond abutting portion 80 (FIG. 2) and into portion 78. The process must be controlled so the end of the stack does not move significantly beyond portion 80 and into a section of portion 78 where the carriages are traveling at an excessive speed relative to the stack speed so damaging collisions would occur.

The upset gap can be detected by placing a sensor 94 (FIG. 3B) that senses each passing carriage near the exit end 50 and comparing the actual time between carriages to the expected time between carriages. In this way the position and size of the upset gap is detected and appropriate action can be taken to make sure the gap is accommodated before it reaches the end of the stack. If the gap is not detected well before reaching the end of the stack, there will not be enough time to make necessary corrections. The sensor may be located at the entrance to the transport section or ahead of the transport section for efficient operation of the system.

Strategy 1) will be discussed further referring to FIG. 2. When the upset gap is detected and the first delayed carriage is in the transport portion, the speed of all carriages in the transport portion 74, represented normally by line 76, is momentarily increase slightly, represented by dashed line 76'. This causes some of the carriages affected by the temporary speed increase to get to the end of the stack slightly earlier than normal which will cause the moving stack to increase in length and the end position of the stack at 87 to move toward portion 78. The most delayed of the plurality of delayed carriages will get to the abutting portion on time. The time that the temporary speed increase is maintained is determined by the length of the transport portion, the magnitude of the speed increase, and the size of the upset gap. For instance, for a given upset gap, if the transport portion is long, the speed increase can be low; if the transport portion is short, the speed increase must be high. The size of the upset gap is only determined after the sensor detects the first bunched-up following the gap. Compensation for the gap must begin immediately since it may take a long time to determine a large gap is present and then the time and distance to correct the gap is already diminished. Ordinarily, the speed increase compensates for the delayed carriages being out of position during the time the gap takes to travel the length of the transport portion. In this way, by the time the gap reaches the critical abutting portion 80, there are already enough carriages accumulated to make up for the diminished number of carriages arriving due to the upset gap. After compensation by speeding up the delayed carriages and lengthening the stack, the speed in the transport portion is returned to normal (represented by line 76). Eventually the upset gap reaches the end of the stack lengthened by the accumulated carriages, and there is then a lag before the on-time delayed carriage reaches the end of the stack. During this lag time, the moving stack length decreases from its compensated state, and the end of the stack moves to the left in the figure away from portion 78 until it reaches the normal position represented by 87 in FIGS. 2 and 3A. Normal operation has then been restored.

Figure 4:
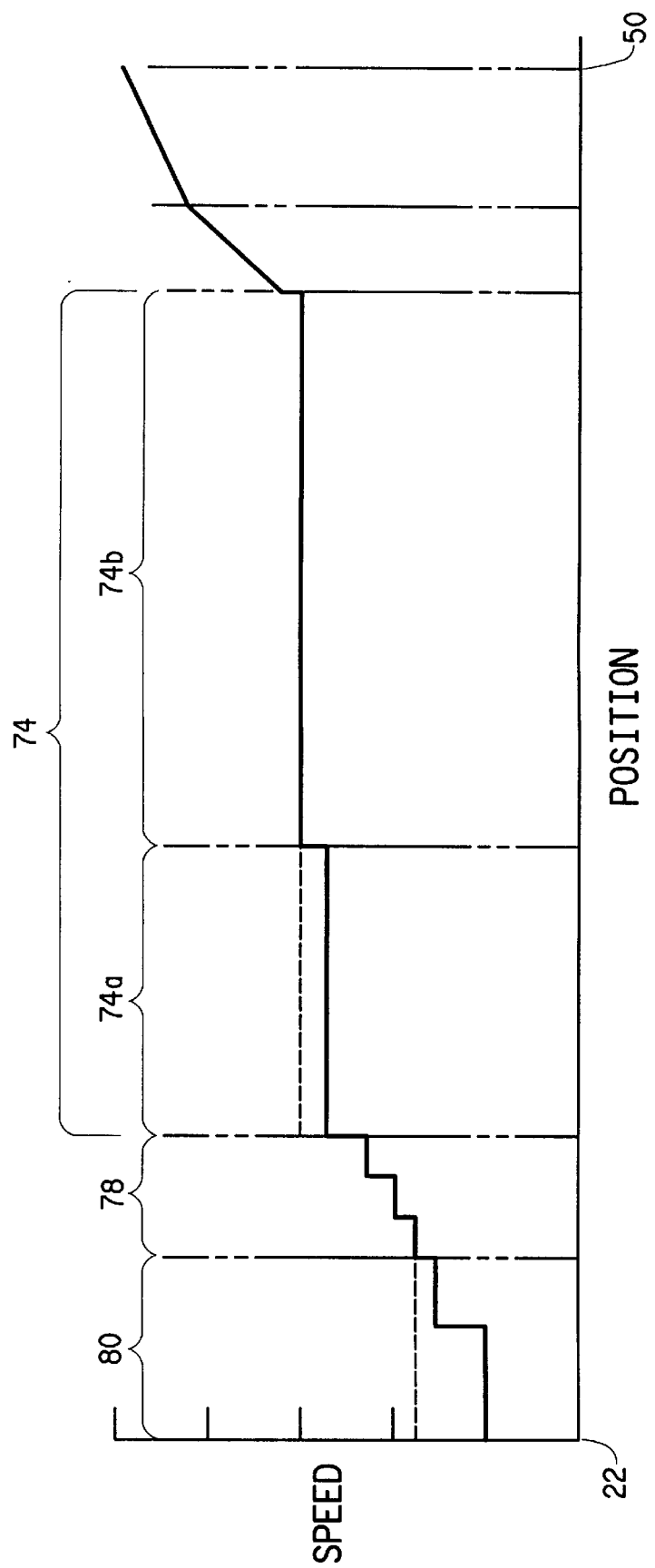
FIG. 4 shows a variation of the speed versus position plot of FIG. 2 wherein the transport portion has two subsections.

A variation of stategy 1), as just discussed, is illustrated in FIG. 4 where the transport portion 74 is not operated as a single constant speed portion, but as two constant speed subsections 74a and 74b with the short section 74a being variable to provide catch up capability to momentarily speed up delayed carriages and increase the stack length to accommodate upset gaps. In this case, the speed increase in the short portion would ordinarily be higher than that required in the longer portion illustrated in FIG. 2 since it acts on fewer carriages for the same time. The speed increase of portion 74a is started when it is estimated that the delayed carriages that are behind their steady state position arrive in 74a and can continue until the delayed carriages exit zone 74a.

Another variation of strategy 1), which was mentioned earlier, is to provide the catch up ability only in the abutting portion 80. Since the abutting portion has a relatively short length compared to the transport portion, it provides only limited repositioning of delayed carriages and accumulation of additional carriages. If the upset gap is large, say more than 2 meters, this variation is not expected to be effective. Since the abutting portion often only includes the turning wheel 91, there is limited ability to physically increase the length of the abutting portion. The abutting portion can be virtually extended into the space closing portion 78 by suitable control of the carriage drive system, so after an upset gap is detected, a modest capability to reposition delayed carriages and increase the stack length may be possible to accommodate larger upset gaps.

Obviously, some combination of the variations just discussed may be employed with the transport portion to accommodate the upset gap using strategy 1). That is, the speed increase may apply to the transport portion in whole or part and, if necessary, to the space closing portion and the abutting portion to achieve a capability that matches the upset gaps to be expected in operation. To summarize, strategy 1) is to detect the upset gap as it enters the return side and increase the speed of a plurality of carriages in the transport portion, and additionally in other following portions, as soon as the first delayed carriage is in the transport portion to catchup the delayed carriages and lengthen the stack before the gap reaches the stack. Preferably the delayed carriages are caught up before the gap leaves the transport portion and reaches the abutting portion.

Figure 5:
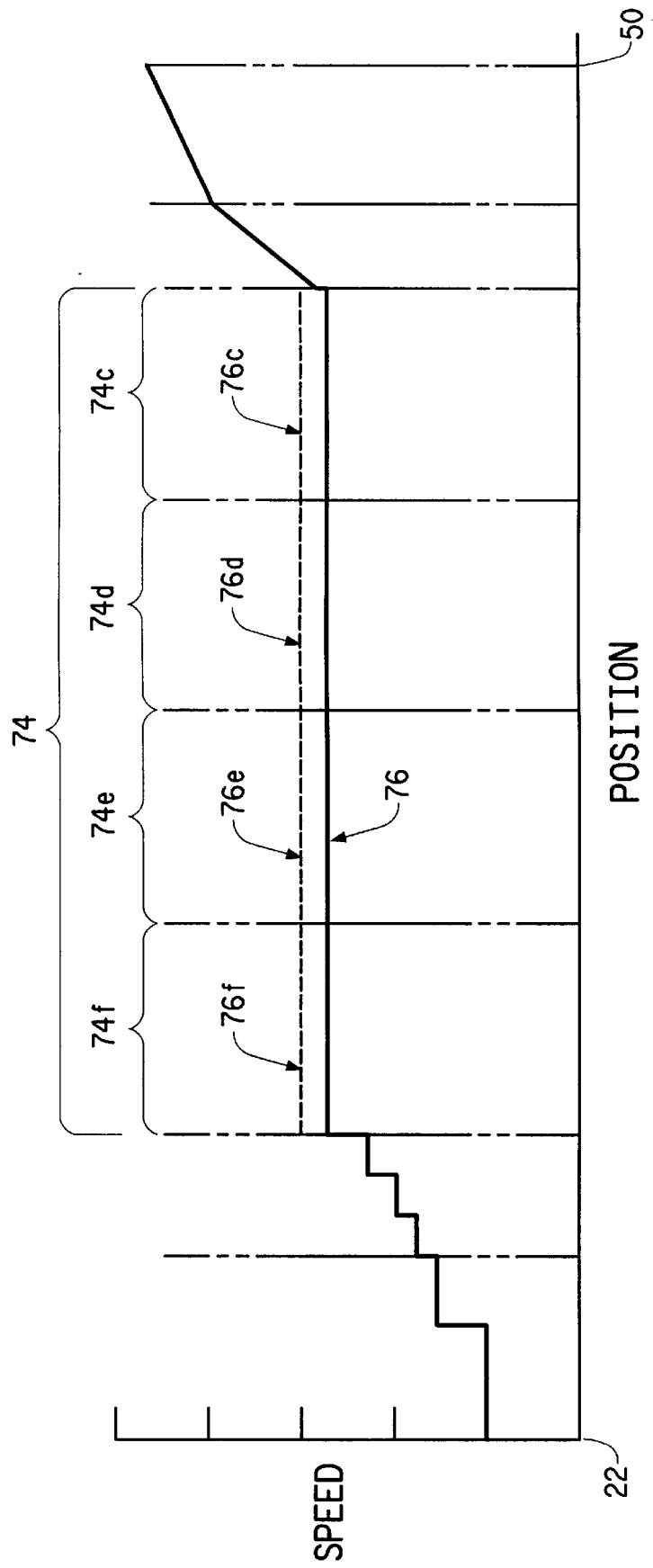
FIG. 5 shows a variation of the speed versus position plot of FIG. 2 wherein the transport portion has several subsections.

Strategy 2) will be discussed further referring to FIGS. 3B, 3C and 5. In FIG. 5, the transport portion 74 is normally operated as a single constant speed portion as indicated by line 76, but it has subsections 74c, 74d, 74e, and 74f that can be controlled to vary the carriage speed in each subsection independently of other subsections, as indicated by line 76c for subsection 74c; and by line 76d for subsection 74d; and by line 76e for subsection 74e; and by line 76f for subsection 74f. In this way, the speed of a selected subsection can be increased as the bunched-up carriages are present to speed up only those carriages, and some immediately adjacent the bunched-up ones that happen to be in the same subsection at the same time. When the upset gap 90 is first detected by sensor 94, it is in the position shown in FIG. 3B with the gap 90 ahead of the bunched-up carriages 96 relative to the direction of carriage motion indicated by arrow 98. When the end of the gap is detected by detecting the first bunched-up carriage 26c and the first delayed carriage is in subsection 74c (FIG. 5), the subsection 74c can change the propulsion speed of the carriages from line 76 to line 76c. This would continue until it is calculated that the bunch of carriages 96 is passing into subsection 76d. At this point subsection 76d would change the propulsion speed of the carriages from line 76 to line 76d and join subsection 76c in propelling the carriages at the increased speed. When it is calculated that the bunch of carriages 96 have left subsection 74c, the propulsion speed in this subsection is changed from line 76c to line 76. This process continues and the speed of subsection 74e is increased to that indicated by line 76e as the calculated position of the bunched-up carriages reaches subsection 74e, and the speed of subsection 74d is decreased to that indicated by line 76; and the speed of subsection 74f is increased to that indicated by 76f and the speed of subsection 74e is reduced to that indicated by line 76.

Figure 3C:
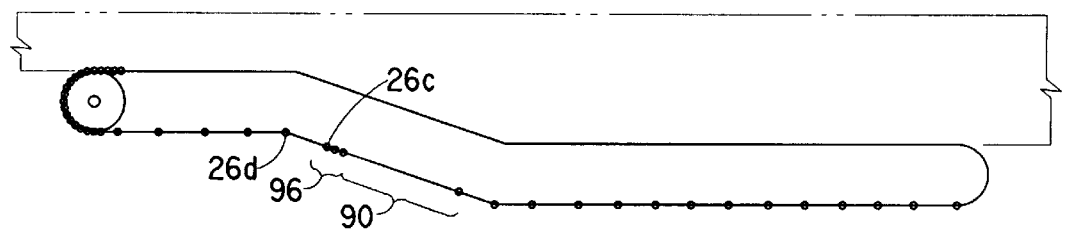

At about this point (if not sooner) the bunched-up carriages 96 being propelled by subsection 74f have caught up to an expected spacing with the leading undelayed carriage 26d as shown in FIG. 3C, and the upset gap 90 is now trailing the bunched-up carriages 96. The bunched-up carriages may also have become spaced apart slightly due to the process. In this situation, the first and most delayed of the bunched-up carriages has now caught up to its steady state, expected, position and the bunched-up carriages provide a momentary increase in the length of the stack to accommodate the upset gap that now follows the bunched-up carriages. This strategy 2) is preferred to strategy 1) if there is a need to close very large gaps. Since the control zones are shorter, it provides the ability to more controllably increase the speed of only the carriages which are delayed. This permits a higher gap closing speed to be used without getting the undelayed carriages to arrive at abutting portion 80 too early. For very large gaps, adjacent zones (such as 76c and 76d) may be at the higher velocity simultaneously. For very large gaps, sones 76f, 76e, 76d, and 76c may all be at the high velocity simultaneously for a short time and then one by one return to their normal velocity as the delayed carriages leave each zone.

What is claimed is:

1. A method of temporarily speeding up delayed carriages on the return side of an endless loop of driven carriages in a linear motor web tenter comprising two such loops, each driven carriage provided with a linear motor secondary adapted for web stretching propulsion on a web engaging side of the endless loop, comprising:

(a) propelling the driven carriages, at a constant speed in a transport portion on the return side, with a propulsion means interacting with the carriage secondary, the transport portion extending over a length of the return side between a carriage entrance end and a carriage exit end, said constant speed being such as to provide a steady state supply of carriages to a continuously abutted length of carriages in a moving stack at a carriage abutting portion adjacent the exit of the return side;

(b) propelling the carriages, at a speed less than said constant speed, at said abutting portion with a propulsion means interacting with the carriage secondary;

(c) sensing the distances between carriages arriving in the transport portion on the return side and detecting the excess length of an undesirable gap between undelayed and delayed carriages arriving in the transport portion on the return side;

(d) temporarily increasing the speed of the carriages in the transport portion on the return side including the first of the delayed carriages in response to said undesirable gap;

(e) continuing said temporarily increasing to increase the speed of the delayed carriages until they are undelayed and to temporarily increase the length of the stack;

(f) decreasing the speed of the carriages in the transport portion to said constant speed;

wherein the undesirable gap is eliminated between carriages exiting the return side.

2. The method of claim 1, wherein continuing said temporarily increasing is complete before the undesirable gap reaches the abutting portion.

3. The method of claim 1, wherein continuing said temporarily increasing is complete before the undesirable gap reaches the end of the transport portion.

4. The method of claim 1 wherein decreasing the speed occurs at a predetermined time based on the excess length of the undesirable gap.

5. A method of temporarily speeding up delayed carriages on a return side of an endless loop of driven carriages in a linear motor web tenter comprising two such loops, each driven carriage provided with a linear motor secondary adapted for web stretching propulsion on a web engaging side of the endless loop, comprising:

(a) propelling the driven carriages, at a constant speed in a transport portion on the return side, with a propulsion means interacting with the carriage secondary, the transport portion extending over a length of the return side between a carriage entrance end and a carriage exit end, said constant speed being such as to provide a steady state supply of carriages to a continuously abutted length of carriages in a moving stack at a carriage abutting portion adjacent the exit of the return side;

(b) propelling the carriages, at a speed less than said constant speed, at said abutting portion with a propulsion means interacting with the carriage secondary;

(c) sensing the distances between carriages arriving in the transport portion on the return side and detecting the excess length of an undesirable gap between undelayed and delayed carriages arriving in the transport portion on the return side;

(d) increasing the speed of the delayed carriages so they are no longer delayed and the undesirable gap is following the previously delayed carriages.

6. The method of claim 5, wherein the undesirable gap is following the previously delayed carriages before the undesirable gap reaches the abutting portion.

7. The method of claim 5, wherein the undesirable gap is following the previously delayed carriages before the undesirable gap reaches the end of the transport portion.

8. A method of temporarily speeding up delayed carriages on a return side of an endless loop of driven carriages in a linear motor web tenter comprising two such loops, each driven carriage provided with a linear motor secondary adapted for web stretching propulsion on a web engaging side of the endless loop, comprising:

(a) propelling the driven carriages, at a constant speed in a transport portion on the return side, with a propulsion means interacting with the carriage secondary, the transport portion extending over a length of the return side between a carriage entrance end and a carriage exit end, said constant speed being such as to provide a steady state supply of carriages to a continuously abutted length of carriages in a moving stack at a carriage abutting portion adjacent the exit of the return side;

(b) propelling the carriages, at a speed less than said constant speed, at said abutting portion with a propulsion means interacting with the carriage secondary;

(c) sensing the distances between carriages arriving in the transport portion on the return side and detecting the excess length of an undesirable gap between undelayed and delayed carriages arriving in the transport portion on the return side;

(d) providing a propulsion means for said transport portion for varying the speed of carriages in discrete segments of said transport portion;

(e) temporarily increasing the speed of the carriages in a first subsection of the transport portion on the return side including the first of the delayed carriages in response to said undesirable gap; and then (f) temporarily increasing the speed of the carriages in a second adjacent subsection of the transport portion on the return side including the first of the delayed carriages in response to said undesirable gap; and then (g) decreasing the speed of the carriages in the first subsection of the transport portion to said constant speed when the delayed carriages have left; and then (h) decreasing the speed of the carriages in the second subsection of the transport portion to said constant speed when the delayed carriages have left;

wherein the delayed carriages are caught up and the undesirable gap is following said caught up delayed carriages.

9. The method of claim 8, wherein the undesirable gap is following the previously delayed carriages before the undesirable gap reaches the abutting portion.

10. The method of claim 8, wherein the undesirable gap is following the previously delayed carriages before the undesirable gap reaches the end of the transport portion.

\* \* \* \* \*